US012580609B2

(12) United States Patent
Li

(10) Patent No.: US 12,580,609 B2
(45) Date of Patent: Mar. 17, 2026

(54) ELECTRONIC SHELF LABEL

(71) Applicant: Hanshow Technology Co., Ltd., Jiaxing (CN)

(72) Inventor: Yanchen Li, Jiaxing (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 315 days.

(21) Appl. No.: 18/347,380

(22) Filed: Jul. 5, 2023

(65) Prior Publication Data

US 2024/0013682 A1 Jan. 11, 2024

(30) Foreign Application Priority Data

Jul. 11, 2022 (CN) .......................... 202210808358.1

(51) Int. Cl.
| | |
|---|---|
| *H04B 5/00* | (2024.01) |
| *G06K 19/077* | (2006.01) |
| *G09F 3/20* | (2006.01) |
| *H04B 5/72* | (2024.01) |

(52) U.S. Cl.
CPC ......... *H04B 5/72* (2024.01); *G06K 19/07754* (2013.01); *G06K 19/07779* (2013.01); *G09F 3/204* (2013.01); *G09F 3/208* (2013.01)

(58) Field of Classification Search
CPC .......... H04B 5/00; H04B 5/0031; H04B 5/72; G06K 19/07754; G06K 19/07779; G09F 3/20; G09F 3/208; G09F 3/204
See application file for complete search history.

(56) References Cited

U.S. PATENT DOCUMENTS

2017/0047361 A1* 2/2017 Xu ........................... H10D 1/20

FOREIGN PATENT DOCUMENTS

| | | |
|---|---|---|
| CN | 111323953 A | 6/2020 |
| CN | 113706999 A | 11/2021 |
| DE | 102016124333 A1 | 1/2018 |

OTHER PUBLICATIONS

German Patent and Trademark Office, "First Office Action," issued in connection with German Patent Application No. 10 2023 117 700.1, dated Feb. 8, 2024, 8 pages. [English translation provided].

* cited by examiner

*Primary Examiner* — Tuan H Nguyen
(74) *Attorney, Agent, or Firm* — Hanley, Flight & Zimmerman, LLC

(57) ABSTRACT

An electronic shelf label, including: a TFT substrate integrated with an NFC coil, wherein the NFC coil is configured to realize an NFC function and is connected to an IC or an FPC to drive and control the NFC coil. In examples, the NFC function is integrated into the TFT substrate, so that the size of an FPC or a PCB can be reduced, which not only makes the electronic shelf label thinner and lighter, but also realizes the NFC function without increasing the cost of the FPC or the PCB.

7 Claims, 5 Drawing Sheets

(a)                                    (b)

Third metal layer

Third dielectric layer

Fourth metal layer

Second dielectric layer

Second metal layer
Active layer

First dielectric layer

First metal layer

Glass (a)                                    (b)

(a)                    (b)                    (c)

ELECTRONIC SHELF LABEL

CROSS-REFERENCE TO RELATED APPLICATIONS

This application claims priority to Chinese Patent Application No. 202210808358.1, filed on Jul. 11, 2022, which is hereby incorporated by reference in its entirety.

TECHNICAL FIELD

The present disclosure relates to the technical field of electronic shelf labels, and particularly to an electronic shelf label.

BACKGROUND

This section is intended to provide the background or the context for the embodiments of the present disclosure set forth in the claims. The description here is not admitted as prior art by inclusion in this section.

In order to achieve fast networking, short-distance refresh and many other functions, Near Field Communication (NFC) is increasingly widely used in electronic shelf label products. At present, the NFC function of the electronic shelf label is usually realized by integrating an NFC coil into a Flexible Printed Circuit (FPC) or a Printed Circuit Board (PCB). In order to ensure a good NFC function around the electronic shelf label, the size of the NFC coil is usually designed to be equivalent to that of the electronic shelf label, which requires a relatively large size of the FPC or the PCB, resulting in a thicker and heavier electronic shelf label and an increase in the cost of the FPC or the PCB.

SUMMARY

The embodiments of the present disclosure provide an electronic shelf label, including a TFT substrate integrated with an NFC coil for realizing an NFC function. The NFC coil is connected to an IC or an FPC to drive and control the NFC coil.

Compared with the technical solution in the prior art that the NFC coil is integrated into the FPC or the PCB to realize the NFC function of the electronic shelf label, the embodiments of the present disclosure integrate the NFC coil into the Thin Film Transistor (TFT) substrate and connect the NFC coil to the Integrated Circuit Chip (IC) or the FPC to drive and control the NFC coil, thereby reducing the size of the FPC or the PCB, which not only makes the electronic shelf label thinner and lighter, but also realizes the NFC function without increasing the cost of the FPC or the PCB.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

Figures 1, 2:
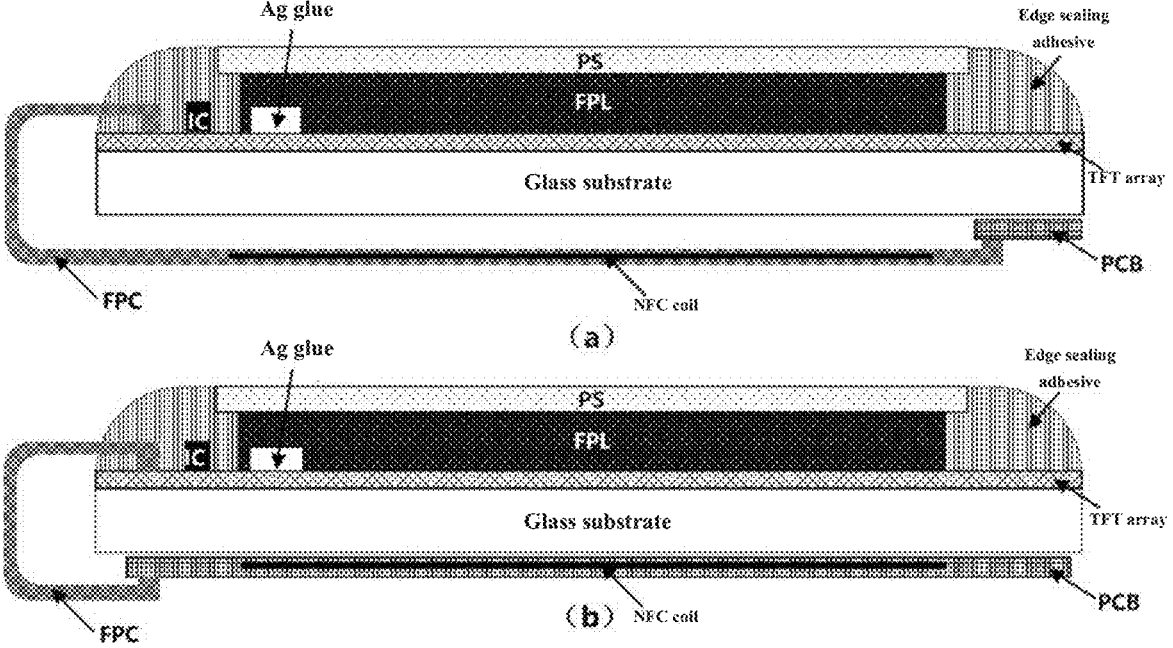
FIG. 1 illustrates structural diagrams of a conventional electronic shelf label (screen module)
FIG. 2 illustrates structural diagrams of two types of pixel designs of a conventional TFT substrate.

As illustrated in FIG. 1, a screen module of an electronic shelf label mainly includes a PCB, an FPC, an IC, a TFT substrate (i.e., a TFT array formed on a Glass substrate), an FPL, a Protect Sheet (PS), Ag glue dots, edge sealing adhesive, etc. In FIG. 1(a), an NFC coil is integrated into the FPC, and in FIG. 1(b), an NFC coil is integrated into the PCB.

As illustrated in FIG. 2, two types of pixel designs of a conventional TFT substrate are shown. For the convenience of understanding, an array of 2*2 pixels is taken as an example for illustration. The pixel includes a horizontal Gate line, a longitudinal Data line, a TFT control switch, a Common Voltage (VCOM) electrode, a pixel electrode, a via, etc. The Gate line is connected to a gate of the TFT and is responsible for controlling the switching of the TFT. The Data line is connected to a source of the TFT and is responsible for transmitting a voltage signal to the pixel electrode. The gate, the source and a drain of the TFT are connected to the Gate line, the Data line and the pixel electrode, respectively, and are responsible for sequentially transmitting the voltage signals in the Data line to the pixel electrode. The VCOM electrode is responsible for providing a VCOM voltage. A storage capacitor is formed between the pixel electrode and the VCOM electrode to store a pixel driving voltage transmitted by the Data line to drive the FPL. The via is responsible for connecting the drain of the TFT to the pixel electrode. In FIG. 2(a), the pixel electrode is formed using a first metal layer and a third metal layer, and a VCOM electrode is formed using a second metal layer. In FIG. 2(b), the pixel electrode is formed using the second metal layer and the third metal layer, and the VCOM electrode is formed using the first metal layer.

Figure 3:
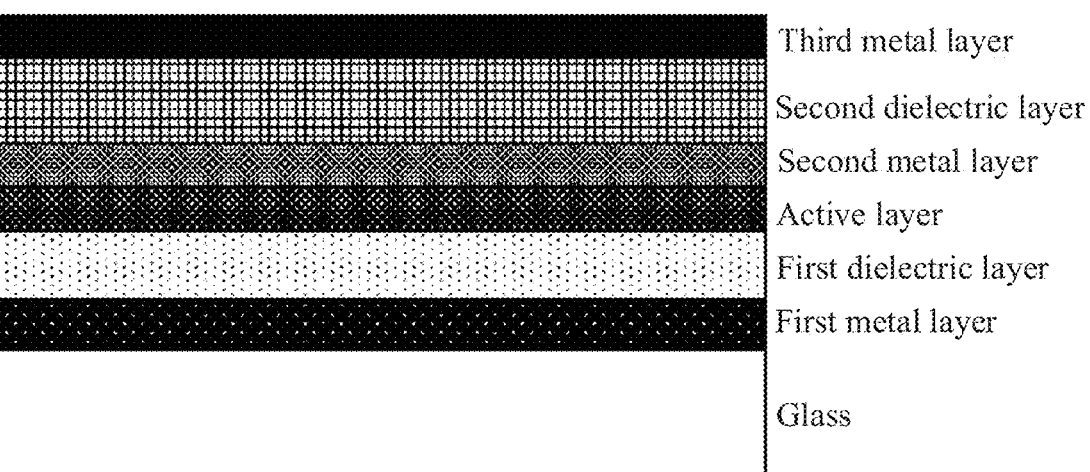
FIG. 3 illustrates a schematic diagram of a film layer structure of a conventional TFT substrate.

As illustrated in FIG. 3, a film layer structure of the corresponding TFT substrate in FIG. 2 is shown. The film layer structure includes, from bottom to top, a first metal layer, a first dielectric layer, an active layer, a second metal layer, a second dielectric layer and a third metal layer in turn. The first metal layer is used to form the Gate line, the gate of the TFT, and the pixel electrode/the VCOM electrode, and its material is usually a conductive material such as Mo, Al, Nd or Cu. The first dielectric layer is used to isolate the first metal layer and the second metal layer, and its material is usually an insulating material such as SiNx or SiO$_2$. The active layer is used to form a conductive channel of the TFT, and its material is usually a-Si, p-Si, IGZO or other semiconductor materials. The second metal layer is used to form the Data line, the source and the drain of the TFT, and the VCOM electrode/the pixel electrode, and its material is usually a conductive material such as Mo, Al, Nd or Cu. The second dielectric layer is used to isolate the second metal layer and the third metal layer, and its material is usually an insulating material such as SiNx, SiO$_2$ or organic resin. The third metal layer is used to form the pixel electrode, and its material is usually a conductive material such as Mo, Al, Nd, Cu or ITO.

Figure 4:
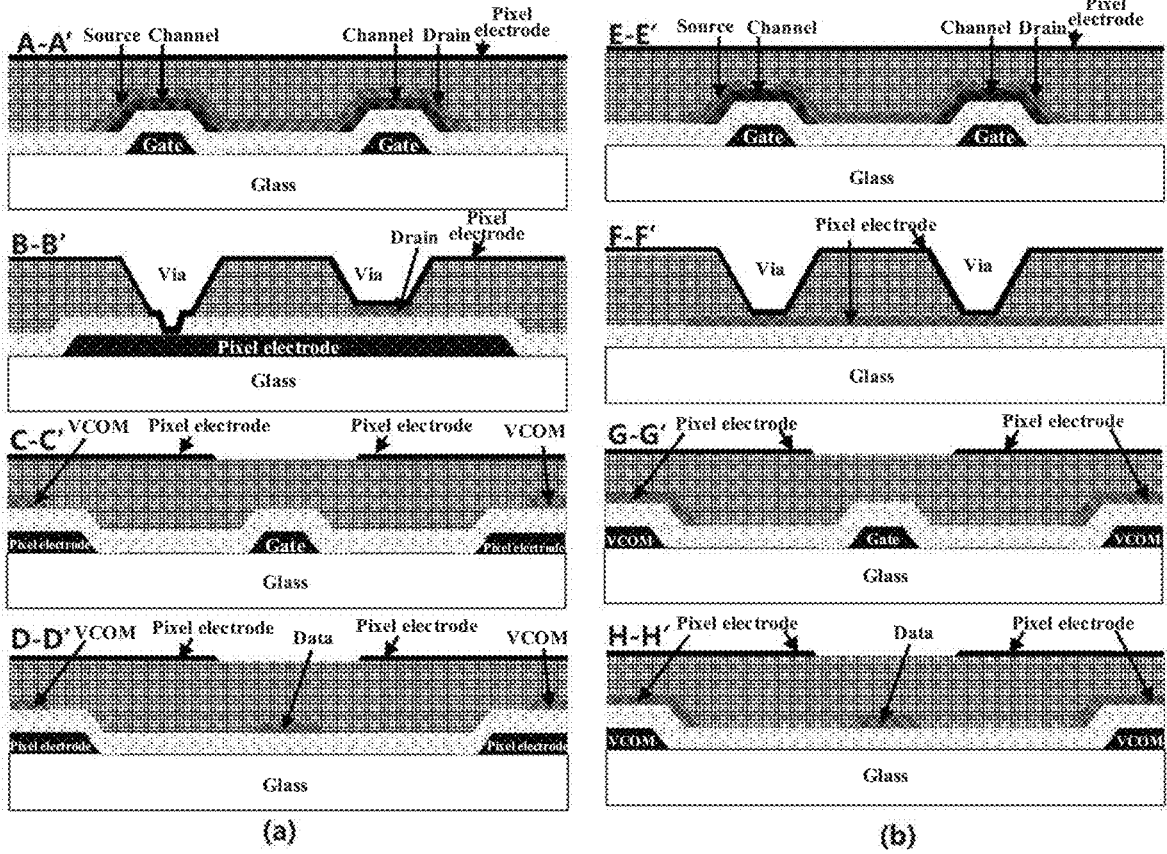
FIG. 4 illustrates longitudinal cross-sectional views of pixels in a conventional TFT substrate.

As illustrated in FIG. 4(a), cross-sectional views of four positions in FIG. 2(a) are shown. A-A' is a cross-sectional view of a position of the TFT, and the TFT is a double-gate TFT to reduce leakage current. B-B' is a cross-sectional view of a position of the via, where the drain of the TFT of the second metal layer, the pixel electrode of the first metal layer, and the pixel electrode of the third metal layer are connected to each other by punching the via in the dielectric layer. C-C' is a longitudinal cross-sectional view between the pixels, where a Gate line formed by the first metal layer is disposed in the middle of a gap between the pixel electrodes formed by the third metal layer. D-D' is a horizontal cross-sectional view between the pixels, where a Data line formed by the second metal layer is disposed in the middle of a gap between the pixel electrodes formed by the third metal layer.

As illustrated in FIG. 4(b), cross-sectional views of four positions in FIG. 2(b) are shown. E-E' is a cross-sectional view of a position of the TFT, and the TFT is a double-gate TFT to reduce leakage current. F-F' is a cross-sectional view of a position of the via, where the drain of the TFT of the second metal layer, the pixel electrode of the second metal layer, and the pixel electrode of the third metal layer are connected to each other by punching the via in the dielectric layer. G-G' is a longitudinal cross-sectional view between the pixels, and a Gate line formed by the first metal layer is disposed in the middle of a gap between the pixel electrodes formed by the third metal layer. H-H' is a horizontal cross-sectional view between the pixels, where a Data line formed by the second metal layer is disposed in the middle of a gap between the pixel electrodes formed by the third metal layer.

According to the inventor's researches, the conventional electronic shelf labels usually realize its NFC function by integrating the NFC coil into the FPC or the PCB. In order to ensure good NFC function around the electronic shelf label, the size of the NFC coil is usually designed to be equivalent to that of the electronic shelf label, which requires a relatively large size of the FPC or the PCB, resulting in a thicker and heavier electronic shelf label and an increase in the cost of the FPC or the PCB.

Based on the problems existed in the prior art, the present disclosure proposes an NFC design related to electronic shelf label products, in particular a design integrating the NFC function into a TFT panel. The NFC coil is used to realize the NFC function, and is connected to an IC or an FPC to drive and control the NFC coil.

According to the present disclosure, the TFT film layer is added with a metal layer as an NFC coil wire, so that the NFC coil is integrated into the TFT substrate, thereby realizing the NFC function of the electronic shelf label product, which not only makes the electronic shelf label thinner and lighter, but also realizes the NFC function without increasing the cost of the FPC or the PCB.

Specifically, the film layer structure of the TFT substrate is added with a metal layer, which forms a horizontal NFC coil wire and a longitudinal NFC coil wire. The horizontal NFC coil wire is disposed above a Gate line formed by a first metal layer and overlapped with the Gate line. The longitudinal NFC coil wire is disposed above a Data line formed by a second metal layer and overlapped with the Data line.

Specifically, the film layer structure of the TFT substrate is further added with a dielectric layer, through which the added metal layer in the film layer structure of the TFT substrate is isolated from a third metal layer in the film layer structure of the TFT substrate.

Specifically, the TFT substrate is an array of pixels, each pixel includes a horizontal NFC coil wire and a longitudinal NFC coil wire, and the NFC coil wires of adjacent pixels are disconnected from each other.

Specifically, a horizontal NFC connection line is formed on the added metal layer in the film layer structure of the TFT substrate, and the NFC coil wires (e.g., horizontal NFC coil wires) in the pixels are connected through the horizontal NFC connection line. A longitudinal NFC connection line is formed on the third metal layer in the film layer structure of the TFT substrate, and is connected to the NFC coil wires (e.g., longitudinal NFC coil wires) in the pixels through vias formed in the added dielectric layer in the film layer structure of the TFT substrate.

The electronic shelf label proposed by the present disclosure will be described below with reference to the specific structural diagrams.

Figure 5:
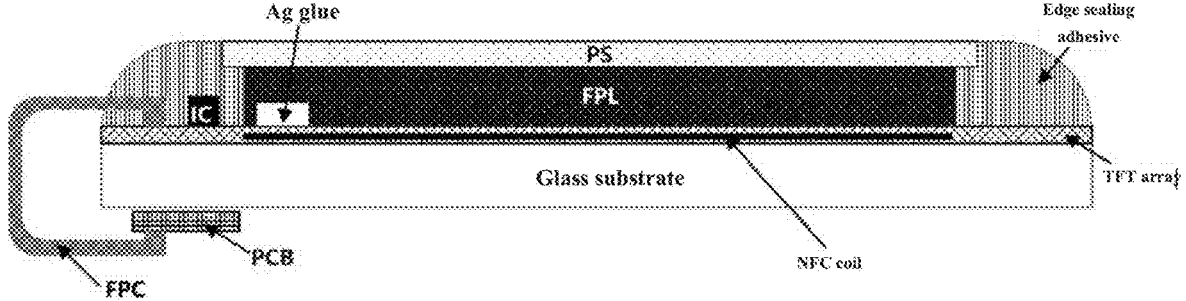
FIG. 5 illustrates a structural diagram of an electronic shelf label (screen module) according to an embodiment of the present disclosure.

As illustrated in FIG. 5, a structural diagram of a screen module of a novel electronic shelf label is shown. In the screen module, an NFC coil is disposed on a TFT substrate (i.e., a TFT array formed on a Glass substrate) to realize an NFC function. By integrating the NFC function into the TFT substrate, the sizes of the FPC and the PCB will not be increased due to the NFC function.

Figure 6:
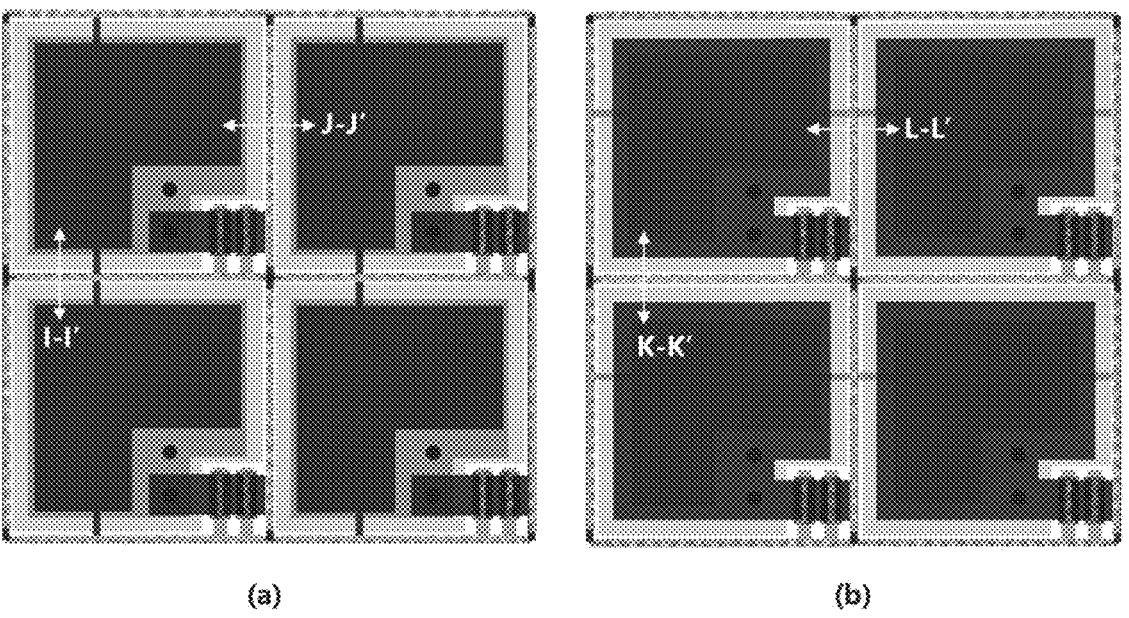
FIG. 6 illustrates two types of pixel designs of a novel TFT substrate according to an embodiment of the present disclosure.

As illustrated in FIG. 6, two types of pixel designs of a novel TFT substrate are shown, where FIG. 6(a) is corresponding to FIG. 2(a) of the conventional pixel design and FIG. 6(b) is corresponding to FIG. 2(b) of the conventional pixel design. On the basis of the conventional designs, a fourth metal layer is added as an NFC coil wire. A horizontal NFC coil wire is disposed above the Gate line and overlapped therewith. A longitudinal NFC coil wire is disposed above the Data line and overlapped therewith. Each pixel is internally provided with a horizontal coil wire and a longitudinal coil wire which can serve as an NFC coil. The NFC coil wire in the pixel has a width of W, which is set according to the requirements of resistance and inductance of the NFC coil, without specific limitations here.

Figure 7:
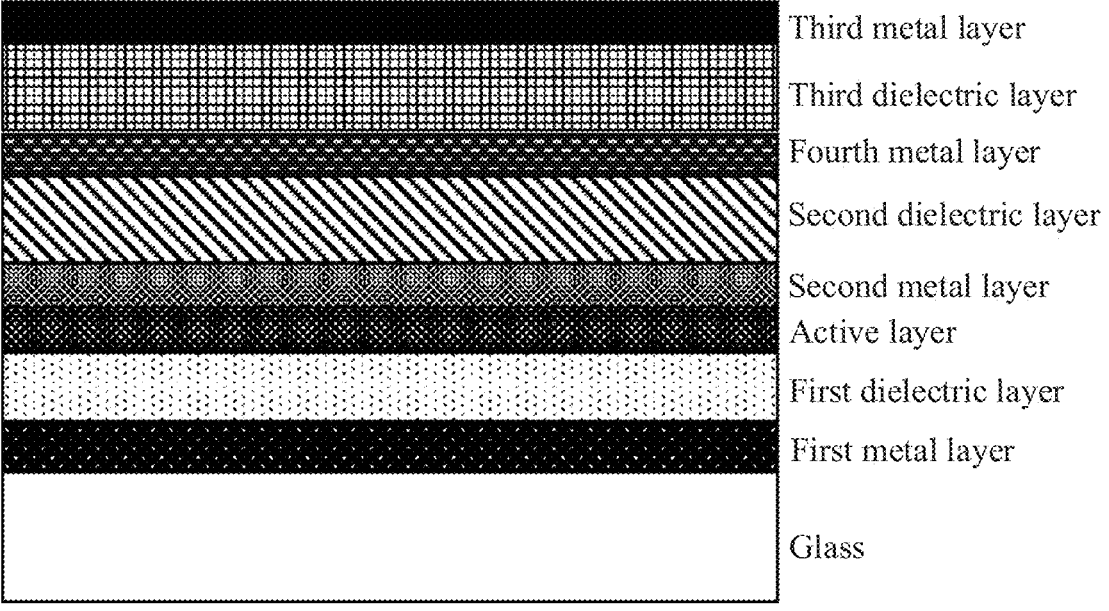
FIG. 7 illustrates a schematic diagram of a film layer structure of a novel TFT substrate according to an embodiment of the present disclosure.

As illustrated in FIG. 7, a film layer structure of a novel TFT substrate is shown, in which a fourth metal layer and a third dielectric layer are added compared with the conventional film layer structure. The fourth metal layer the pixel is used to form horizontal and longitudinal NFC coil wires in, and the third dielectric layer is used to isolate the fourth metal layer from the third metal layer. The thicknesses of each metal layer and each dielectric layer are set according to the requirements of capacitance and resistance of the coil wire, without specific limitations here.

Figure 8:
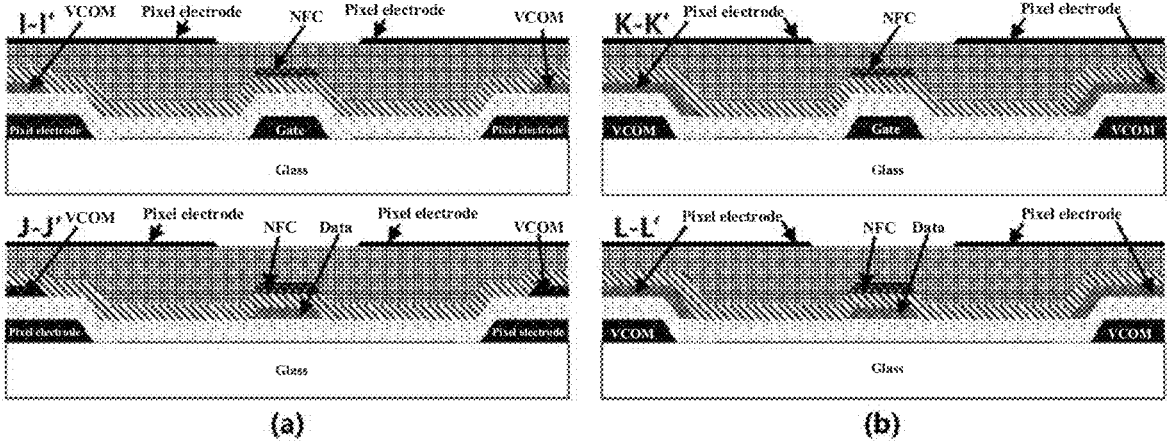
FIG. 8 illustrates longitudinal cross-sectional views of pixels in a novel TFT substrate according to an embodiment of the present disclosure.

As illustrated in FIG. 8(*a*), cross-sectional views of two positions in FIG. 6(*a*) are shown. I-I' is a longitudinal cross-sectional view between the pixels, where an NFC coil wire formed by the fourth metal layer is disposed above the Gate line formed by the first metal layer and overlapped with the Gate line, and the NFC coil wire and the Gate line are isolated from each other by the first dielectric layer and the second dielectric layer. J-J' is a horizontal cross-sectional view between the pixels, where an NFC coil wire formed by the fourth metal layer is disposed above the Data line formed by the second metal layer and overlapped with the Data line, and the NFC coil wire and the Data line are isolated from each other by the second dielectric layer. As illustrated in FIG. 8(*b*), cross-sectional views of two positions in FIG. 6(*b*) are shown. K-K' is a longitudinal cross-sectional view between the pixels, where an NFC coil wire formed by the fourth metal layer is disposed above the Gate line formed by the first metal layer and overlapped with the Gate line, and NFC coil wire and the Gate line are isolated from each other by the first dielectric layer and the second dielectric layer. L-L' is a horizontal cross-sectional view between the pixels, where the NFC coil wire formed by the fourth metal layer is disposed above the Data line formed by the second metal layer and overlapped with the Data line, and the NFC coil wire and the Data line are isolated from each other by the second dielectric layer.

Figure 9:
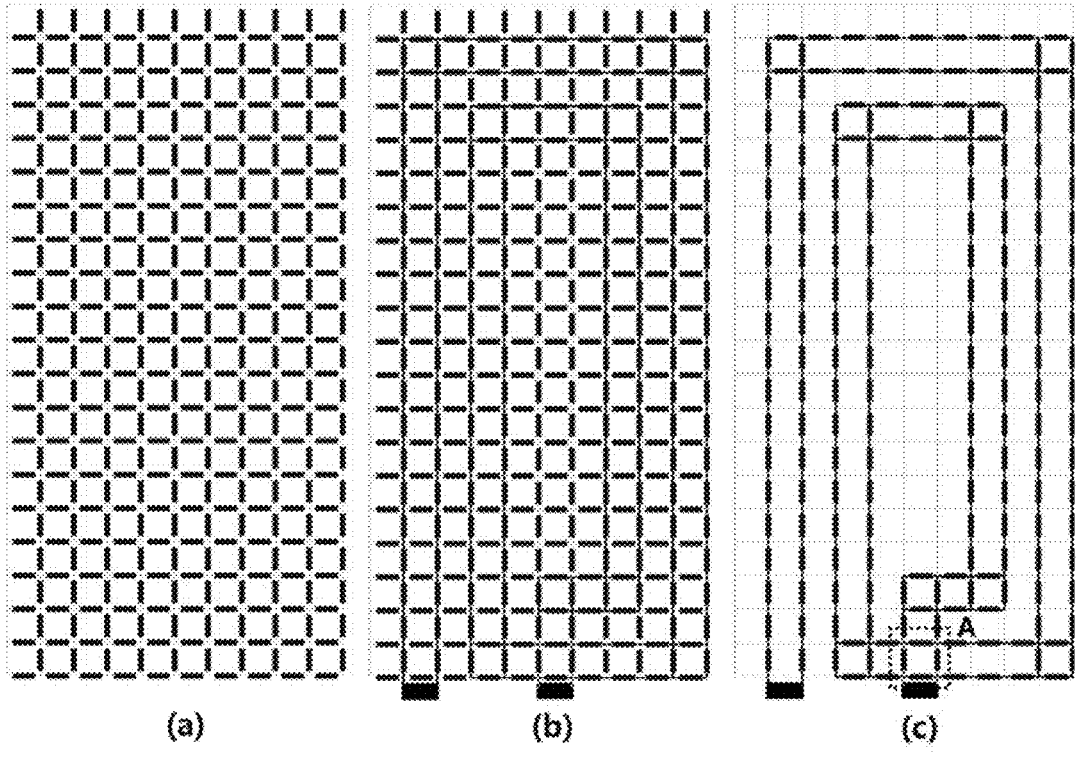
FIG. 9 illustrates schematic diagrams of designs of an NFC coil according to an embodiment of the present disclosure.

As illustrated in FIG. 9, design diagrams of an NFC coil are shown. For the convenience of understanding, an array of 20*10 pixels is taken as an example for illustration, and the actual design is based on the specific resolution of the product. Meanwhile, only the designs of film layers related to the NFC coils are shown here. FIG. 9(*a*) illustrates a schematic diagram of NFC coil wires available in an array of pixels. The NFC coil wire is formed by a fourth metal layer, and each pixel includes a horizontal NFC coil wire and a longitudinal NFC coil wire, and the NFC coil wires of adjacent pixels are disconnected from each other. FIG. 9(*b*) illustrates a schematic diagram of a connected NFC coil. In order to form an NFC coil with a coil wire width of 2W and a coil turn number of 2, connection lines are disposed at appropriate positions in the arrays of pixels, with black thin lines representing the connection lines formed by the fourth metal layer and gray thin lines representing the connection lines formed by the third metal layer. The NFC connection line represented by the black thin line and the NFC coil wire in the pixel are formed by the same metal layer, and may be directly connected. The NFC connection line represented by the gray thin line and the NFC coil wire in the pixel are formed by different metal layers, and are connected through a via. FIG. 9(*c*) illustrates a schematic diagram of an NFC coil excluding irrelevant lines, from which it can be clearly seen that an NFC coil with a coil wire width of 2W and a coil turn number of 2 is formed through appropriate connection lines. In the actual product, the parameters such as length, width, coil wire width (the number of parallel coil wires), coil wire distance and the number of coil turns of the NFC coil should be set according to the actual demand, without specific limitations here.

Figure 10:
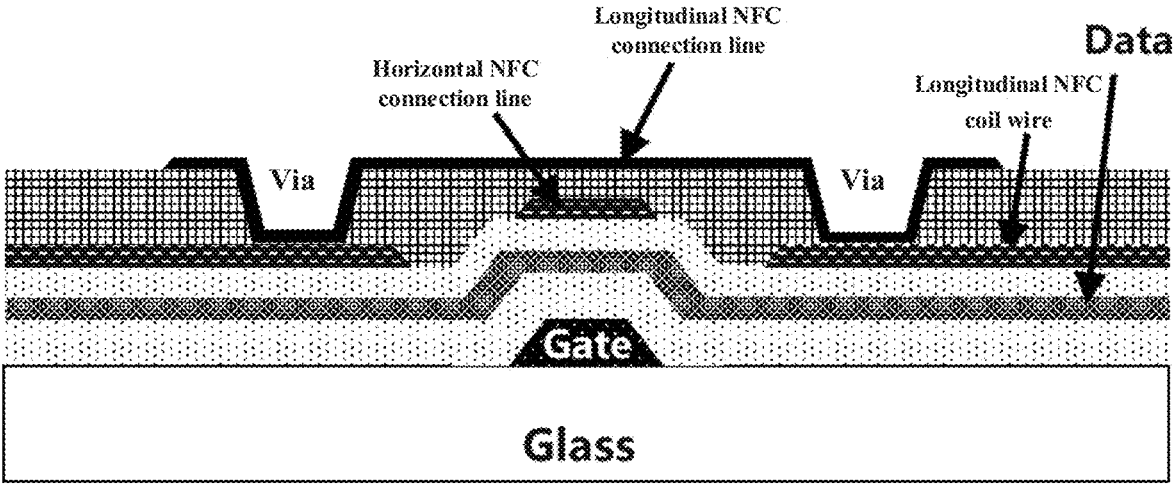
FIG. 10 illustrates a longitudinal cross-sectional view of position A according to an embodiment of the present disclosure.

As illustrated in FIG. 10, a longitudinal cross-sectional view of position A in FIG. 9 is shown. Since a horizontal NFC connection line formed by the fourth metal layer is disposed between the upper and lower pixels, a via formed by the third dielectric layer and a longitudinal NFC connection line formed by the third metal layer may be adopted to realize the connection of the upper and lower NFC coil wires across the horizontal NFC connection line.

To sum up, by adding a metal layer in the TFT substrate to dispose the NFC coil wire, the NFC coil can be integrated into the TFT substrate. The NFC coil integrated into the TFT substrate is ultimately connected to an IC or an FPC to control and drive the NFC coil wire. Since the NFC coil wire integrated into the TFT substrate is disposed in a separate metal layer, and is independent from the wires that drives the display, the NFC signal and the display signal may be driven either simultaneously or time-divisionally.

Compared with the technical solution in the prior art that the NFC coil is integrated into the FPC or the PCB to realize the NFC function of the electronic shelf label, the embodiment of the present disclosure can reduce the size of the FPC or the PCB by integrating the NFC function into the TFT substrate, which not only makes the electronic shelf label thinner and lighter, but also realizes the NFC function without increasing the cost of the FPC or the PCB.

Those skilled in the art should appreciate that any embodiment of the present disclosure can be provided as a method, a system or a computer program product. Therefore, the present disclosure can take the form of a full hardware embodiment, a full software embodiment, or an embodiment combining software and hardware. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or a block diagram of the method, device (system) and computer program product according to the embodiments of the present disclosure. It shall be appreciated that each flow and/or block in the flow diagram and/or the block diagram and a combination of flows and/or blocks in the flow diagram and/or the block diagram can be realized by computer program instructions. Those computer program instructions can be provided to a general computer, a dedicated computer, an embedded processor or a processor of other programmable data processing device to produce a machine, so that the instructions executed by the processor of the computer or other programmable data processing device produce means for realizing specified functions in one or more flows in the flow diagram and/or one or more blocks in the block diagram.

These computer program instructions may also be stored in a computer readable memory capable of guiding the computer or other programmable data processing devices to work in a particular manner, so that the instructions stored in the computer readable memory can produce manufacture articles including an instructing device which realizes function(s) specified in one or more flows in the flow diagram and/or one or more blocks in the block diagram.

These computer program instructions may also be loaded onto the computer or other programmable data processing devices, so that a series of operation steps are performed on the computer or other programmable data processing devices to produce a processing realized by the computer, thus the instructions executed on the computer or other programmable devices provide step(s) for realizing function(s) specified in one or more flows in the flow diagram and/or one or more blocks in the block diagram.

The above specific embodiments further explain the objectives, technical solutions and advantageous effects of the present disclosure in detail. As should be understood, those described above are merely specific embodiments of the present disclosure, and are not intended to limit the protection scope of the present disclosure. Any modification, equivalent substitution, improvement, etc. made within the spirit and principle of the present disclosure should be included in the protection scope of the present disclosure.

What is claimed is:

1. An electronic shelf label, comprising a TFT substrate integrated with an NFC coil for realizing an NFC function, wherein the NFC coil is connected to an IC or an FPC to drive and control the NFC coil;

a film layer structure of the TFT substrate is added with a metal layer, which forms a horizontal NFC coil wire and a longitudinal NFC coil wire; the horizontal NFC coil wire is disposed above a Gate line formed by a first metal layer and overlapped with the Gate line, and the longitudinal NFC coil wire is deposed above a Data line formed by a second metal layer and overlapped with the Data line;

the film layer structure of the TFT substrate is further added with a dielectric layer, through which the added metal layer in the film layer structure of the TFT substrate is isolated from a third metal layer in the film layer structure of the TFT substrate;

the TFT substrate is an array of pixels, each pixel comprises one horizontal NFC coil wire and one longitudinal NFC coil wire, and NFC coil wires of adjacent pixels are disconnected from each other;

a horizontal NFC connection line is formed on the added metal layer in the film layer structure of the TFT substrate, and the horizontal NFC coil wires in the pixels are connected through the horizontal NFC connection line; and a longitudinal NFC connection line is formed on the third metal layer in the film layer structure of the TFT substrate, and is connected to the longitudinal NFC coil wires in the pixels through vias formed by the added dielectric layer in the film layer structure of the TFT substrate.

2. The electronic shelf label according to claim 1, wherein a film layer structure of the TFT substrate comprises a first metal layer, a first dielectric layer, an active layer, a second metal layer, a second dielectric layer, a fourth metal layer, a third dielectric layer, and a third metal layer provided in sequence;

the fourth metal layer forms a horizontal NFC coil wire and a longitudinal NFC coil wire; the horizontal NFC coil wire is disposed above a Gate line formed by a first metal layer and overlapped with the Gate line, and the longitudinal NFC coil wire is deposed above a Data line formed by a second metal layer and overlapped with the Data line.

3. The electronic shelf label according to claim 1, wherein a film layer structure of the TFT substrate comprises a first metal layer, a first dielectric layer, an active layer, a second metal layer, a second dielectric layer, a fourth metal layer, a third dielectric layer, and a third metal layer provided in sequence;

the fourth metal layer is the added metal layer, the fourth metal layer forms the horizontal NFC coil wire and the longitudinal NFC coil wire, and the horizontal NFC connection line is formed on the fourth metal layer; and the third dielectric layer is the added dielectric layer, and the third dielectric layer forms the vias.

4. The electronic shelf label according to claim 3, wherein each horizontal NFC connection line is located between two longitudinal NFC coil wires that are adjacent to it, and is spaced apart from the two longitudinal NFC coil wires.

5. The electronic shelf label according to claim 4, wherein the longitudinal NFC connection line, which connects to the two longitudinal NFC coil wires through the vias, extends across the horizontal NFC connection line and is spaced apart from the horizontal NFC connection line in a thickness direction of the TFT substrate.

6. The electronic shelf label according to claim 4, wherein the horizontal NFC connection line is overlapped with the Gate line in a thickness direction of the TFT substrate.

7. The electronic shelf label according to claim 1, wherein the horizontal NFC connection line is overlapped with the Gate line in a thickness direction of the TFT substrate.

* * * * *